United States Patent [19]

Korenkiewicz et al.

[11] Patent Number: 4,844,952
[45] Date of Patent: Jul. 4, 1989

[54] MULTILAYERED FINISH HAVING GOOD STAIN RESISTANCE

[75] Inventors: Stephen M. Korenkiewicz; Kurt G. Olson; William G. Boberski, all of Gibsonia; Suryya K. Das, Pittsburgh; S. Thomas Greer, Oakmont; Raymond E. Zaleski, New Kensington, all of Pa.

[73] Assignee: PPG Industries, Inc., Pittsburgh, Pa.

[21] Appl. No.: 139,544

[22] Filed: Dec. 30, 1987

[51] Int. Cl.$^4$ .......................... B05D 1/36; B05D 5/00; B05D 3/02

[52] U.S. Cl. ..................................... 427/258; 427/288; 427/386; 427/411

[58] Field of Search ..................... 427/407.1, 408, 409, 427/410, 411, 258, 288, 386

[56] References Cited

U.S. PATENT DOCUMENTS 3,855,170 12/1974 Junkin et al. .......................... 524/522
4,174,228 11/1979 Boberski et al. ..................... 106/107
4,403,003 9/1983 Backhouse ...................... 427/408 X
4,680,237 7/1987 Kenney et al. ................... 427/407.1

OTHER PUBLICATIONS

DuPont Consumer Catalog advertisement for wallcovering coated with DuPont TEFLON ® soil/stain repellent.

*Primary Examiner*—Michael Lusignan
*Attorney, Agent, or Firm*—Linda Pingitore

[57] ABSTRACT

A method of forming a multilayered finish on a substrate involves:

I. applying a decorative finish to a substrate:

II. applying a clear, aqueous based coating composition over the decorative finish of step I, said clear coating composition containing:

(a) a waterborne polymer having calculated a glass transition temperature of at least about 40° C. and having a one component working parameter of solubility, δ wp, in the range of about 9.0 to about 9.6 (cal./cm$^3$)$^{\frac{1}{2}}$, with $$\delta wp = \frac{\Sigma Fi}{\Sigma Vi}$$

wherein
Fi=the molar attraction constant of an individual functional group of the polymer expressed in cal.$^{\frac{1}{2}}$cm$^{3/2}$/mole, and
Vi=the molar volume constant of an individual group of the polymer expressed in cubic cubic centimeters per mole; and (b) an amount of coalescing component sufficient to form a coalesced film, said clearcoating composition being essentially free of external crosslinking agents; and III. allowing the coating composition to coalesce.

16 Claims, No Drawings

MULTILAYERED FINISH HAVING GOOD STAIN RESISTANCE

BACKGROUND OF THE INVENTION

The present invention relates to methods of preparing multicoated substrates.

The obtention of a decorative finish having enhanced aesthetic appeal as well as superior stain, chemical and mar resistance properties is quite desirable, particularly in environments which characteristically challenge the physical properties of a decorative finish. For household use as well as institutional use such as schools and hospitals, decorative finishes must not only be aesthetically appealing, but also they must be able to withstand the wear and tear attendant to heavily trafficked environments. For example, the decorative finish must exhibit stain resistance to common stains such as food and beverage stains including grease marks as well as cosmetic stains such as lipstick and in addition crayon and ink marks. In this connection the decorative finish also must be able to withstand the use of detergents and other cleaning products. Moreover, the decorative finish must exhibit good mar and burnish resistance so as to resist damage from scrapes and other abrasions to the surface.

Ideally, the decorative finish should also be versatile and be capable of adhering to and protecting a wide variety of substrates including wood, pressed wood, fabric, wallpaper and laminated surfaces. Heretofore, the currently available products have been deficient in one or more of the desirable features, and as a result have been unable to provide the requisite combination of aesthetic and physical properties.

SUMMARY OF THE INVENTION

In accordance with the present invention there is provided a method of forming a multilayered finish on a substrate, comprising:

I. applying a decorative finish to the substrate;
II. applying a clear, aqueous based coating composition over the decorative finish of step I, said clear coating composition comprising:
  (a) a waterborne polymer having a calculated glass transition temperature of at least about 40° C. and having a one component working parameter of solubility, $\delta$ wp, in the range of about 9.0 to about 9.6 (cal./cm$^3$)$^{\frac{1}{2}}$, with $$\delta wp = \frac{\Sigma Fi}{\Sigma Vi}$$

wherein
  $Fi$ = the molar attraction constant of an individual functional group of the polymer expressed in cal.$^{\frac{1}{2}}$cm$^{3/2}$/mole, and
  $Vi$ = the molar volume constant of an individual group of the polymer expressed in cubic centimeters per mole;
  (b) an amount of coalescing component sufficient to form a coalesced film, said clear coating composition being essentially free of external crosslinking agents; and
III. allowing the coating composition of step II to coalesce.

DETAILED DESCRIPTION OF THE INVENTION

The first step of the claimed method involves applying a decorative finish to a substrate. A large variety of decorative finishes are encompassed within the scope of the present invention. The clearcoat can be applied over such decorative finishes as wood, pressed wood, fabric, wallpaper, fabric/paper blends and a variety of laminates. Typically, the decorative finish is either a coating composition or a wallpaper type of finish. When the decorative finish is to be a coating, the coating composition can be selected from a variety of materials, either solvent based or aqueous based; white or colored; and based upon a variety of film-forming materials. The large variety of coating compositions which are conventionally known to those skilled in the art are all suitable for use herein. They will not be discussed in detail since they are readily known and commercially available. The decorative finish can also be patterned or embossed.

The next step of the claimed method involves applying over the aforesaid decorative finish a clear, aqueous based coating composition. The clear coating composition comprises as a film-former a waterborne polymer. The clear coating composition is typically a one package composition. One very important feature of the claimed clear coating composition is that it is essentially free of external crosslinking agents. It is thus a lacquer type coating composition.

A variety of waterborne polymer are suitable for use herein so long as the polymer has a calculated glass transition temperature of at least about 40° C. and a one component working parameter of solubility, $\delta$ wp in the range of from about 9.0 to about 9.6 (cal.cm$^3$)$^{\frac{1}{2}}$. Preferably the calculated glass transition temperature is at least 55° C., more preferably ranges from about 65° C. to about 120° C. and most preferably from about 75° C. to about 95° C. The working parameter of solubility preferably ranges from about 9.25 to about 9.6 (cal./cm$^3$)$^{\frac{1}{2}}$.

Generally, the solubility of an organic species may be expressed by its solubility parameter, defined as:

$$\delta = F/V$$

Where F is a molar attraction constant of an organic species (calories—cubic centimeters)$^{\frac{1}{2}}$ per mole; and V is a molar volume constant of the species in cubic centimeters per mole. Where the organic species comprises one or more chemical groups, a parameter of solubility for the whole organic species may be calculated from the weight average of the individual chemical groups. Where the constants listed in Table 1 are used for calculating this parameter of solubility, the result is designated a "working parameter of solubility", $\delta$ wp, which may be expressed as $$\delta wp = \frac{\Sigma Fi}{\Sigma Vi}$$

The working parameter of solubility values for many organic groups may be calculated from molar attraction and molar volume constant found in the literature. The values set forth in Table 1, for example, are drawn from the considerable empirical, and theoretical efforts of Hoy and Van Krevelen, verifying and expanding upon the earlier work of P. A. Small.

The calculated glass transition temperature is calculated in the following manner:

$$\frac{1}{Tg} = \Sigma \frac{Xi}{Tgi}$$

wherein:

Xi is the weight fraction of each monomer making up the waterborne polymer; and

Tgi is the glass transition temperature of a homopolymer of the monomer in degrees Kelvin.

A detailed discussion of the manner of calculating glass transition temperature in this way can be found in D. H. Soloman, The Chemistry of Organic Film Formers, Robert F. Krieger Publishing Co., Huntington, NY, 1977, pages 28-29.

The waterborne polymer is preferably an emulsion polymer and more preferably an acrylic emulsion polymer. Besides these preferred materials, other suitable waterborne polymers include vinyl chloride polymers, vinylidene chloride polymers, vinyl acetate polymers, aqueous polyurethane polymers, and water reducible polymers such as polyester polymers. The preparation of these different types of polymers is well appreciated by those skilled in the art of polymer chemistry. If a detailed discussion is desired, see Golding, *Polymers and Resins,* D. Van Nostrand Company, Inc. 1959; Oil and Colour Chemists' Association, *Surface Coatings,* Chapman and Hall Ltd., 1983; Craver and Tess, *Applied Polymer Science,* American Chemical Society, Division of Organic Coatings and Plastics Chemistry, 1975; and Dietrich, "Aqueous Emulsions, Dispersions and Solutions of Polyurethanes; Synthesis and Properties", *Progress in Organic Coatings,* Vol. 9, pages 281–340, Elsevier, Sequoia S. A. Lausanne, 1981.

The aqueous based acrylic emulsion polymers which are preferred are prepared in accordance with conventional methods of emulsion polymerization. For a detailed discussion of aqueous emulsion polymerization, see D. Blackley, *Emulsion Polymerization, Theory and Practice,* John Wiley & Sons, New York, 1975.

The preferred acrylic emulsion polymers are preferably prepared from a vinyl monomer component which comprises vinyl monomers which contain one or more functional groups. Preferably, the acrylic emulsion polymer is prepared from a vinyl monomer component which comprises at least about 5 percent by weight of a vinyl monomer selected from epoxy functional vinyl monomers, hydroxyl functional vinyl monomers and mixtures thereof and up to 2.0 percent by weight of an acid functional vinyl monomer. Examples of suitable epoxy functional vinyl monomers include glycidyl acrylate, glycidyl methacrylate and allyl glycidyl ether. Examples of suitable hydroxyl functional vinyl monomers include 2-hydroxyethyl acrylate, 2-hydroxyethyl methacrylate, 2-hydroxypropyl acrylate, 2-hydroxypropyl methacrylate, 2-hydroxybutyl methacrylate; and vinyl acetate polymers or copolymers which are subsequently hydrolyzed. Examples of suitable acid functional vinyl monomers include acrylic acid, methacrylic acid and mono esters of unsaturated dicarboxylic acids such as maleic acid, fumaric acid, and itaconic acid, for example, mono(hydroxyethyl) and mono(hydroxypropyl) esters of maleic acid. Preferably the acrylic emulsion polymer is derived from at least about 10 percent by weight of a hydroxyl functional vinyl monomer and contains up to 1.0 percent by weight of acid functional vinyl monomer. The preferred hydroxyl functional vinyl monomers are 2-hydroxyethyl acrylate and methacrylate and the preferred acid functional vinyl monomers are acrylic and methacrylic acid. The balance of the vinyl monomer component can include other vinyl monomers which contain polymerizable vinyl unsaturation so long as the calculated glass transition temperature and the one component working parameter of solubility are within the limits set forth herein.

The clear coating composition of the claimed invention comprises, in addition to the waterborne polymer, an amount of coalescing component sufficient to form a coalesced film. The coating composition can be coalesced at ambient temperatures; or alternatively force drying or baking at elevated temperatures can be used. "Ambient temperatures", for the purposes of the present invention, include temperatures from about 5° C. to about 40° C. The coalescing component is typically present in the claimed clear coating composition in an amount ranging from about 5 to about 25 percent by weight, the percentages being based on the total weight of the composition.

The coalescing component can be a single solvent or a blend of solvents. Suitable solvents include 4-hydroxy-4-methyl-2-pentanone; n-butoxypropanol; ethylene glycol monopropyl ether; ethylene glycol monobutyl ether; ethylene glycol monohexyl ether; diethylene glycol monopropyl ether; diethylene glycol monobutyl ether; diethylene glycol monohexyl ether; propylene glycol phenyl ether; blends of aromatic glycol ethers such as DALPAD A which is commercially available from Dow Chemical; dipropylene glycol methyl ether; N-methyl-2-pyrrolidone; benzyl alcohol; tetrahydro-2-furylmethanol; mixture of ethylene glycol, diethylene glycol and triethylene glycol mono-2-ethylhexyl ether, which is commercially available from Eastman as EKTASOLVE EEH; and 2,2,4-trimethyl-1,3-pentanediol monoisobutyrate. In one embodiment, the coalescing component is a blend of solvents which comprises benzyl alcohol and 2,2,4-trimethyl-1,3-pentanediol monoisobutyrate.

The clear coating compositions of the claimed invention can be formulated with suitable flatting agents such that a range of gloss is obtained. The coating composition can be formulated so as to obtain a matte finish, or alternatively a very high gloss finish can be achieved, depending upon the amount of flatting agent which is utilized. Suitable flatting agents include diatomaceous silica such as CELITE 499 commercially available from Manville; synthetic silicas such as OK-412 precipitated silica from Degussa; silicas produced by a hydrogel process such as the SILICRON G series from SCM; urea formaldehyde condensation products such as PERGOPAK M-3 from Lonza, Inc.; fumed silica such as the AEROSIL series from Degussa; micronized waxes; micronized polyethylene; and micronized modified polyethylene wax. The preferred flatting agent is a urea formaldehyde condensation product available from Lonza, Inc. as PERGOPAK M-3. The amount of flatting agent can vary from about 0 percent to about 10 percent, the percentages based on the total weight of the components of the composition.

The clear coating composition of the claimed invention can contain a variety of other additives, including other resinous ingredients so long as they do not detrimentally affect the properties of the clear coating composition. In addition, other additives such as flow control agents, rheology modifiers, bactericides and mildewcides can be used.

The clear coating composition can be applied over the decorative finish by any conventional method known in the art including spray, brush, pad or roller application. Once applied, the clear coating composition is allowed to coalesce to achieve the transparent finish.

The multilayer system of the claimed invention is very advantageous in that it provides superior stain resistance to common household stains such as food, grease, and beverages such as coffee and various juices. Also the clear coating provides stain resistance to cosmetic stains such as lipstick and also crayon and ink stains. Moreover, the clear coat provides excellent mar and burnish resistance. In addition, the clear coating composition is exceptionally resistant to detergents and other cleaners which are typically used in the cleaning process.

The following examples are illustrative of the invention and are not intended to be limiting.

TABLE 1

| Chemical Group | Molar Attraction Constant[b] $F_i[(cal\text{-}cm^3)^{\frac{1}{2}}/mole]$ | Molar Constant[b] $V_i(cm^3/mole)$ |
| --- | --- | --- |
| $-CH_2-$ | 131.5 | 15.85 |
| $-CH_3$ | 148.3 | 23.9 |
| $\diagdown CH \diagup$ | 86.0 | 9.45 |
| $-\underset{\mid}{\overset{\mid}{C}}-$ | 32.0 | 4.6 |
| $-OH-$ | 225.8 | 9.7 |
| $-O-$ (ether) | 115.0 | 10.0 |
| phenyl | 683 | 72.7 |
| $-C=O$ | 263.0 | 13.4 |
| $-COO-$ | 326.6 | 18.25 |
| $-O-$ (epoxide) | 176.2[a] | 10.0 |

[a]Hoy, J. P. T., 42, 76 (1970).
[b]D. W. Van Krevelen et al, Properties of Polymers; Their Estimation and Correlation With Chemical Structure, 2nd edition, Elsevier Scientific Publishing Co., Amsterdam, 1976.

EXAMPLE I

Part A

This part of the Example illustrates the preparation of an aqueous acrylic emulsion polymer containing hydroxy groups according to the present invention.

| Charge | Ingredients | Parts by Weight (grams) |
| --- | --- | --- |
| I | deionized water | 775.3 |
|   | SIPEX UB[1] | 2.5 |
|   | sodium bicarbonate | 1.8 |
| II | deionized water | 760.4 |
|   | SIPEX UB | 30.0 |
|   | TRITON N101[2] | 50.0 |
|   | IGEPAL CO 897[3] | 30.0 |
|   | PLURONIC P85[4] | 9.0 |

-continued

| Charge | Ingredients | Parts by Weight (grams) |
| --- | --- | --- |
|   | potassium hydroxide (25 percent in water) | 12.0 |
| III | methyl methacrylate | 847.0 |
|   | ethyl acrylate | 539.3 |
|   | styrene | 171.2 |
|   | 2-hydroxyethyl acrylate | 154.8 |
|   | 1-dodecanethiol | 6.0 |
|   | acrylic acid | 10.2 |
| IV | deionized water | 100.3 |
|   | potassium persulfate | 5.0 |
| V | deionized water | 30.0 |
|   | isoascorbic acid | 3.0 |
|   | ferrous ammonium sulfate | 0.01 |
| VI | deionized water | 25.1 |
|   | hydrogen peroxide (35 percent in water) | 4.0 |
| VII | deionized water | 30.1 |
|   | isoascorbic acid | 3.0 |
|   | ferrous ammonium sulfate | 0.01 |
| VIII | deionized water | 25.2 |
|   | hydrogen peroxide (35 percent in water) | 4.0 |
| IX | deionized water | 14.1 |
|   | KAYTHON LX[5] | 1.4 |

[1]This was a 30 percent solution in water of sodium lauryl sulfate which is commercially available from Alcolac.
[2]Commercially available from Rohm and Haas, this is nonyl phenol polyethoxylate containing approximately 10 moles of ethylene oxide which is 100 percent active.
[3]Commercially available from GAF, this is nonyl phenol polyethoxylate containing 40 moles of ethylene oxide which is 70 percent active.
[4]This surfactant is an ethylene oxide propylene oxide block copolymer which is commercially available from BASF.
[5]This biocide comes as a 1.5 percent solution in water and it is commercially available from Rohm and Haas.

A suitably equipped reactor vessel was charged with (I) under a nitrogen atmosphere with agitation and heated to 80° C. Subsequently, a preemulsion was first formed by adding Charge (III) into (II) under agitation and then 60 grams of this preemulsion was added to the reaction mixture and held at 80° C. for 5 minutes. Charge (IV) was then added at the same temperature and held for 30 minutes followed by the addition of the remainder of the preemulsion over a three hour period. Following the addition of the preemulsion, the reaction mixture was heated to 85° C. and held at this temperature for 90 minutes followed by cooling to 50° C. Charge (V) was then added followed by (VI). The reaction mixture was then held for 30 minutes at approximately the same temperature (50° C.) followed by Charge (VII), Charge (VIII) and then a 30 minute hold at the same temperature. The reaction mixture was cooled to 35° C., Charge (IX) was added and the entire contents filtered through a 150 mesh screen. The resultant product had a total solids content determined at 150° C. for one hour of 50.3 percent, an acid value of 2.7, a pH of 3.6 and a particle size of 1710 Angstroms. The particle size was determined using Photon Correlation Spectroscopy using a Coulter N-4 instrument.

Part B

This part of the Example illustrates the preparation of a clear coating composition utilizing the acylic emulsion polymer of Part A in order to evaluate the chemical and stain resistance properties associated with the polymer.

The following coating composition was utilized:

| Ingredients | Parts by Weight (grams) |
| --- | --- |
| HEC solution (2 percent)[6] | 10 |
| polymer of Part A | 50 |

| Ingredients | Parts by Weight (grams) |
|---|---|
| diethylene glycol monopropyl ether | 15 |

[6] This hydroxyethyl cellulose solution was prepared by first slurrying for 5 minutes in deionized water hydroxyethyl cellulose powder (NATROSOL 250 MR powder from Hercules). A trace amount of ammonia was then added followed by mixing for 20 minutes.

The ingredients were combined together with agitation for five minutes.

The clear coating composition was evaluated for chemical and stain resistance as detailed below.

The following materials were utilized in the evaluation:

1. Lenetta white scrub charts Form P-122-10N cut to 6.5×8.5 inches commercially available from Lenetta Company.
2. 3 mil Bird type drawdown bar.
3. Pine Power ® cleaning solution (20 percent pine oil) used full strength (commerically available from TEXIZE).
4. Soft sponge.
5. Stains:
   a. mustard
   b. concentrated red Koolaid ® fruit drink (1 pkg. dissolved in 50 ml. deionized water)
   c. Lipstick
   d. Merthiolate
   e. Stamp Pad Ink (Carter's black)
   f. Permanent Magic Markers (Carter's Marks-A-Lot black, red and green)
6. Chemical Reagents:
   a. Pine Power ® (20 percent pine oil used full strength from TEXIZE)
   b. Windex ® window cleaner used full strength commercially available from Drackett Products Company.
   c. Clorox ® bleach commercially available from Chlorox Company (5¼ percent sodium hypochlorite)
   d. Liquid Draino ® commercially available from Drackett Products Company
   e. 5 percent Sodium Hydroxide
   f. 28 percent Ammonium Hydroxide
   g. 35 percent Hydrochloric acid
7. No. 740E filter discs from Schleicher and Schuell Inc. Kenne N.H. 03431

The sample panel for evaluation was prepared by making a 3.0 mil thick drawdown of the clear coating composition on the Lenetta scrub panel. The film was allowed to dry for 16 hours at room temperature (77° F.) and then an additional 24 hours at 140° F.

Each stain was applied directly to the left half of the scrub panel in the order listed above.

On the right side of the scrub panel, filter discs were arranged in two columns of four disks each. Each chemical reagent was applied to each of the filter disks to saturate it (about 4 drops). Each disk was covered with a one inch watch glass. The stains and chemical reagents were allowed to remain on the film for 16 hours. The panel was then rinsed with warm water and scrubbed with a damp sponge saturated with the Pine Power solution (25 back and forth rubs).

The evaluation of the panel utilized the following ratings:

Stain Ratings

0—No stain
2—Very slight stain
4—Slight stain
6—Moderate stain
8—Severe stain
10—Total stain
(None removed)

Chemical Resistance

0—No effect
2—Soften, shadow or very slight gloss loss
4—Slight blister, discolor, or gloss loss
6—Blister or strong discolor
8—Film erosion or deep color
10—Film destroyed The ratings of this Example appear below in Table II.

EXAMPLES II to XI

These Examples illustrate the preparation of acrylic emulsion polymers containing hydroxyl groups with variations in the proportion of monomers utilized. The polymers were prepared as has been detailed above in Part A of Example I. The polymers were also formulated into a clear coating composition identical to that of Part B of Example I with the exception of the polymer, and evaluated as has been detailed in Part B of Example I. The monomer contents of each of these polymers along with those of Example I are detailed in Table I. The ratings for stain and chemical resistance appear in Table II.

TABLE I

| Example | percent acrylic acid | percent methyl methacrylate | percent ethyl acrylate | percent 2-hydroxyethyl methacrylate | percent styrene |
|---|---|---|---|---|---|
| I | 0.5 | 49.3 | 31.3 | 9.0 | 9.9 |
| II | 0.5 | 67.3 | 13.3 | 9.0 | 9.9 |
| III | 0.5 | 49.3 | 22.3 | 18.0 | 9.9 |
| IV | 0.5 | 58.3 | 13.3 | 18.0 | 9.9 |
| V | 0.5 | 58.3 | 22.3 | 9.0 | 9.9 |
| VI | 0.5 | 58.3 | 8.8 | 22.0 | 9.9 |
| VII | 0.5 | 62.8 | 8.8 | 18.0 | 9.9 |
| VIII | 0.5 | 62.8 | 13.3 | 13.5 | 9.9 |
| IX | 0.5 | 67.3 | 8.8 | 13.5 | 9.9 |
| X | 0.5 | 67.3 | 4.3 | 18.0 | 9.9 |
| XI | 0 | 58.3 | 8.8 | 22.0 | 9.9 |
| XII | 0.5 | 31.3 | 31.3 | 27.0 | 9.9 |

TABLE II

| Example | Tg* (°C.) | Working Solubility Parameter | Mustard | Conc. Koolaid | Lipstick | Merthiolate | Stamp Pad Ink | Magic Marker | 20% Pine Oil | Windex | Clorox | Liquid Draino | 5% Sodium Hydroxide | 28% Ammonium Hydroxide | 35% hydrochloric acid |
|---|---|---|---|---|---|---|---|---|---|---|---|---|---|---|---|
| I | 52.6 | 9.4 | 2 | 0 | 0 | 5 | 2 | 4 | 10 | 4 | 0 | 4 | 0 | 4 | 2 |
| II | 81.3 | 9.3 | 0 | 0 | 0 | 0 | 0 | 0 | 10 | 0 | 0 | 0 | 0 | 0 | 0 |
| III | 61.6 | 9.6 | 2 | 0 | 0 | 4 | 4 | 4 | 10 | 2 | 0 | 0 | 0 | 4 | 4 |
| IV | 76.1 | 9.5 | 0 | 0 | 0 | 6 | 0 | 2 | 10 | 1 | 0 | 0 | 3 | 0 | 0 |
| V | 66.3 | 9.4 | 0 | 0 | 0 | 2 | 2 | 1 | 10 | 1 | 0 | 0 | 0 | 0 | 0 |
| VI** | 81.3 | 9.5 | 2 | 0 | 0 | 6 | 0 | 4 | 3 | 1 | 0 | 1 | 4 | 4 | 4 |
| VII | 83.9 | 9.5 | 0 | 0 | 0 | 5 | 0 | 0 | 2 | 0 | 0 | 0 | 0 | 0 | 0 |

TABLE II-continued

| Example | Tg* (° C.) | Working Solubility Parameter | Mustard | Conc. Kool-aid | Lipstick | Merthiolate | Stamp Pad Ink | Magic Marker | 20% Pine Oil | Windex | Chlorox | Liquid Draino | 5% Sodium Hydroxide | 28% Ammonium Hydroxide | 35% hydrochloric acid |
|---|---|---|---|---|---|---|---|---|---|---|---|---|---|---|---|
| VIII | 78.7 | 9.4 | 0 | 0 | 0 | 2 | 0 | 0 | 10 | 0 | 0 | 0 | 0 | 0 | 0 |
| IX | 86.6 | 9.4 | 0 | 0 | 0 | 0 | 0 | 0 | 10 | 0 | 0 | 0 | 0 | 0 | 0 |
| X | 92.0 | 9.4 | 0 | 0 | 0 | 0 | 0 | 0 | 3 | 0 | 0 | 0 | 0 | 0 | 0 |
| XI | 81.3 | 9.5 | 2 | 0 | 0 | 4 | 0 | 0 | 3 | 0 | 0 | 0 | 0 | 0 | 0 |
| XII | 43.9 | 9.8 | 6 | 2 |   | 8 | 6 | 4 | 10 | 3 | 2 | 3 | 4 | 4 | 4 |

*calculated glass transition temperature
**It is believed that these results are inconsistent with the monomer content of the emulsion polymer because of perhaps a misfeed or a contaminated charge during synthesis of the emulsion polymer.

EXAMPLE XII

Comparative Example

Part A

This part of the Example illustrates the criticality of the working parameter of solubility of the waterborne polymer for the achievement of good stain and chemical resistance properties.

| Charge | Ingredients | Parts by Weight (grams) |
|---|---|---|
| I | deionized water | 775.8 |
|   | SIPEX UB | 2.5 |
|   | sodium bicarbonate | 1.8 |
| II | deionized water | 760.6 |
|   | SIPEX UB | 30.1 |
|   | TRITON N101 | 50.2 |
|   | IGEPAL CO 897 | 30.0 |
|   | PLURONIC P85 | 9.0 |
|   | potassium hydroxide (25 percent in water) | 12.0 |
| III | methyl methacrylate | 539.1 |
|   | ethyl acrylate | 539.7 |
|   | styrene | 171.2 |
|   | 2-hydroxyethyl methacrylate | 463.5 |
|   | 1-dodecanethiol | 6.0 |
|   | acrylic acid | 10.0 |
| IV | deionized water | 100.3 |
|   | potassium persulfate | 5.0 |
| V | deionized water | 30.0 |
|   | isoascorbic acid | 3.0 |
|   | ferrous ammonium sulfate | 0.01 |
| VI | deionized water | 25.0 |
|   | hydrogen peroxide (35 percent in water) | 4.0 |
| VII | deionized water | 30.3 |
|   | isoascorbic acid | 3.0 |
|   | ferrous ammonium sulfate | 0.1 |
| VIII | deionized water | 25.1 |
|   | hydrogen peroxide (35 percent in water) | 4.0 |
| IX | deionized water | 14.0 |
|   | KAYTHON LX | 1.4 |

This hydroxyl containing aqueous acrylic emulsion polymer was prepared in the manner detailed above in Example I. The product had a total solids content of 50.3 percent determined at 150° C. for one hour, a pH of 3.7 and a particle size of 2000 Angstroms.

Part B

The acrylic emulsion polymer prepared in Part A, above was formulated into a clear coating composition as is detailed in Part B of Example I above. The composition also was evaluated for stain and chemical resistance as has been detailed in Example I. The ratings appear in Table II, below. The percentages of each of the monomers are shown in Table I.

EXAMPLES XIII-XIV

These Examples illustrate the preparation of acrylic emulsion polymers with 1 percent and 2 percent acid, respectively.

| | | Example XIII | Example XIV |
|---|---|---|---|
| | | Parts by Weight (grams) | |
| Charge | Ingredients | | |
| I | deionized water | 1200.4 | 1200.6 |
|   | SIPEX UB | 1.6 | 1.6 |
|   | sodium bicarbonate | 1.0 | 1.0 |
| II | deionized water | 710.0 | 710.1 |
|   | SIPEX UB | 30.0 | 30.0 |
|   | TRITON N 101 | 50.0 | 50.0 |
|   | ammonium hydroxide (28 percent) | 5.0 | 5.0 |
| III | glycidyl methacrylate | 355.1 | 355.3 |
|   | ethyl acrylate | 343.4 | 343.5 |
|   | styrene | 267.1 | 267.3 |
|   | methyl methacrylate | 737.1 | 737.1 |
|   | methacrylic acid | 18.1 | 36.0 |
| IV | deionized water | 30.2 | 30.7 |
|   | ammonium persulfate | 3.0 | 3.0 |
| V | deionized water | 10.0 | 10.0 |
|   | ammonium hydroxide (28 percent) | 1.0 | 1.0 |

The acrylic emulsion polymers were prepared as has been detailed above in Example I, Part A. The product of Example XIII had a total solids content of 46.9 percent at 150° C. for one hour, an epoxy equivalent weight of 1586 and a particle size of 1520 Angstroms. The product of Example XIV had a total solids content of 46.1 percent at 150° C. for one hour, an epoxy equivalent weight of 1643 and a particle size of 1500 Angstroms.

When formulated into clear coating compositions both polymers resulted in good stain and chemical resistance.

EXAMPLE XV

This Example illustrates the preparation of a preferred epoxy functional acrylic emulsion polymer.

| Charge | Ingredients | Parts by Weight (grams) |
|---|---|---|
| I | deionized water | 3875.2 |
|   | SIPEX UB | 12.5 |
|   | sodium bicarbonate | 9.0 |
| II | deionized water | 3800.4 |
|   | SIPEX UB | 150.0 |
|   | TRITON N101 | 250.0 |
|   | IGEPAL CO 897 | 150.1 |
|   | PLURONIC P85 | 22.5 |
|   | potassium hydroxide (25 percent in water) | 30.1 |
| III | glycidyl methacrylate | 1776.2 |
|   | ethyl acrylate | 2146.8 |

| Charge | Ingredients | Parts by Weight (grams) |
|---|---|---|
| | styrene | 1126.8 |
| | methyl methacrylate | 3500.1 |
| | 1-dodecanethiol | 30.0 |
| | acrylic acid | 48.1 |
| IV | deionized water | 502.3 |
| | potassium persulfate | 20.0 |
| V | deionized water | 250.0 |
| | isoascorbic acid | 7.5 |
| | ferrous ammonium sulfate | 0.1 |
| VI | deionized water | 250.0 |
| | hydrogen peroxide (35 percent in water) | 10.0 |
| VII | deionized water | 70.0 |
| | KATHON LX | 7.0 |

The emulsion polymer was prepared in the manner detailed above in Example I. The product had a pH of 4.8 and a total solids content of 48.8 percent at 150° C. for one hour. This polymer had a working parameter of solubility of 9.53 and a calculated glass transition temperature of 55.9° C.

EXAMPLE XVI-XIX

These Examples illustrate the effect upon stain and chemical resistance of variations in the amount of epoxy functional monomer in the acrylic emulsion polymer. The amounts tested were 0 percent, 10 percent, 20 percent and 30 percent based on the total weight of vinyl monomers.

| | | EXAMPLE | | | |
|---|---|---|---|---|---|
| | | XVI | XVII | XVIII | XIX |
| Charge | Ingredients | Parts by Weight (grams) | | | |
| I | deionized water | 1516 | 1516 | 1515 | 1515 |
| | sulfopropyl methacrylate | 8 | 8 | 8.2 | 8 |
| II | deionized water | 30 | 30 | 30 | 30 |
| | ammonium persulfate | 8.63 | 8.63 | 8.63 | 8.63 |
| III | glycidyl methacrylate | 0 | 155 | 310 | 465.3 |
| | ethyl acrylate | 310 | 310 | 310.5 | 310 |
| | methyl methacrylate | 1085 | 930.1 | 775.5 | 621 |
| | styrene | 156 | 155 | 155.1 | 155 |

To a suitably equipped reactor vessel was charged (I), under nitrogen atmosphere, and heated to 80° C. Charge (II) was added followed by the addition of Charge (III) over a three hour period. The reaction mixture was then held at 80° C. for 45 minutes and then cooled to room temperature. The products had the following properties:

| Example | Total solids at 150° C. for 1 hour | pH | Epoxy equivalent weight |
|---|---|---|---|
| XVI | 49.9 percent | 2.2 | Not applicable |
| XVII | 50.4 percent | 3 | 3279 |
| XVIII | 50.3 percent | 2.7 | Not determined |
| XIX | 50.2 percent | 2.6 | 1093 |

Each of the acrylic emulsion polymers was formulated into a clear coating composition as has been described above in Part B of Example I. The panels were prepared and tested similarly except that some of the stains were different and some different chemical reagents were used. Also, the rating system was different. The stains were:
mustard
magic markers
lipstick
merthiolate
stamp pad ink The chemical reagents were:
5 percent sodium hydroxide
35 percent hydrochloric acid
85 percent $H_3PO_4$
6 percent $HNO_3$
chlorox
acetic acid
mineral spirits
xylene The stain ratings were as follows: Each rating between 1 and 5 is indicative of the cleaner needed to remove the entire stain. Each rating between 7 and 10 is indicative of the amount of stain left after the xylene wash.

Stain Ratings 1 water rinse
2 Fifty percent solution of Mr. Clean in water
3 Pine Power ® cleaning solution (20 percent pine oil) from Texize
4 mineral spirits
5 xylene
7 slight stain
9 stain
10 severe stain

Chemical Resistance Ratings 0 no effect
2 soften or shadow
4 slight blister or discoloration
6 blister or strong discoloration
8 film erosion or deep color
10 film destroyed The ratings appear in Table III, below.
The data demonstrates that the stain and chemical resistance properties associated with the waterborne polymer improve with higher levels of epoxy functional monomer.

EXAMPLE XX

Comparative Example

This Example illustrates the criticality of the glass transition temperature of the waterborne polymer for the achievement of good stain and chemical resistance properties.

| Charge | Ingredients | Parts by Weight (grams) |
|---|---|---|
| I | deionized water | 865.4 |
| | AEROSOL OT-75[7] | 3.1 |
| | sulfopropyl methacrylate | 8.8 |
| II | deionized water | 37.3 |
| | ammonium persulfate | 7.5 |
| III | styrene | 60.8 |
| | ethyl acrylate | 31.5 |
| | glycidyl methacrylate | 31.1 |
| IV | deionized water | 361.5 |
| | AEROSOL OT | 10.0 |
| | TRITON 101 | 25.1 |
| V | butyl acrylate | 375.1 |
| | methyl methacrylate | 101.0 |
| | acrylic acid | 25.0 |
| | styrene | 100.6 |
| VI | deionized water | 361.4 |
| | AEROSOL OT | 10.0 |
| | TRITON 101 | 25.0 |
| VII | glycidyl methacrylate | 275.6 |

-continued

| Charge | Ingredients | Parts by Weight (grams) |
|--------|-------------|-------------------------|
|        | ethyl acrylate | 51.0 |
|        | methyl methacrylate | 225.8 |
|        | styrene | 43.1 |
| VIII   | deionized water | 75.0 |

[7] This surfactant is sodium dioctyl sulfosuccinate. It is commercially available from American Cyanamid as a 75 percent solution in water with a trace of isopropanol.

To a suitably equipped reactor vessel was charged (I) under nitrogen atmosphere and heated to 82° C. Charge (III) was then added and held for 5 minutes followed by (II) with a 30 minute hold. A preemulsion was first prepared by mixing Charges (IV) and (V) and then added over 1 and ½ hours. Subsequently, a second preemulsion was formed by mixing Charges (VI) and (VII) and this preemulsion was added over 1 and ½ hours. Finally Charge (VIII) was added, the reaction mixture was held for 1 hour at 82° C. and then cooled. The resultant emulsion had a total solids content of 45.4 percent determined at 110° C. for one hour, an epoxy equivalent weight of 2277 and a particle size of 1713 angstroms.

The emulsion was formulated into a clear coating composition as detailed in Part B of Example I and evaluated as detailed in Examples XVI to XIX. The stain and chemical resistance results are set out in Table III.

TABLE III:

| | | | | | STAIN RATINGS | | | | | |
|---|---|---|---|---|---|---|---|---|---|---|
| Example | Tg (° C.) | Solubility Parameter | Mustard | Markers | Lipstick | Merthiolate | Stamp Pad Ink | 5% NaOH | 35% HCL | 85% $H_3PO_4$ | 6% $HNO_3$ |
| XVI | 75.4 | 9.25 | 1 | 4 | 2 | 1 | 1 | 0 | 0 | 4 | 3 |
| XVII | 68.8 | 9.35 | 1 | 5 | 2 | 1 | 1 | 0 | 0 | 4 | 2 |
| XVIII | 62.5 | 9.44 | 1 | 5 | 2 | 1 | 1 | 0 | 0 | 4 | 0 |
| XIX | 56.4 | 9.53 | 1 | 5 | 2 | 1 | 1 | 0 | 0 | 2 | 0 |
| XX | 22.3 | 9.60 | 1 | 9 | 2 | 8 | 8 | 0 | 0 | 4 | 3 |

| Example | Chlorox | acetic acid | mineral spirits | xylene |
|---------|---------|-------------|-----------------|--------|
| XVI | 2 | 10 | gloss loss | severe gloss loss |
| XVII | 0 | 8 | 0 | very slight gloss loss |
| XVIII | 0 | 9 | 0 | 0 |
| XIX | 0 | 8 | 0 | 0 |
| XX | 0 | 10 | 0 | severe gloss loss |

EXAMPLE XXI

This example illustrates the preparation of a clear coating composition according to the claimed invention.

| Charge | Ingredients | Parts by Weight (grams) |
|--------|-------------|-------------------------|
| A | deionized water | 140.0 |
|   | NATROSOL 250 MR[8] | 0.8 |
| B | amino methyl propanol[9] | 0.15 |
| C | AEROSOL OT-75 | 0.50 |
|   | FOAMASTER R[10] | 0.50 |
| D | triethyl phosphate | 4.0 |
|   | 2,2,4-trimethyl-1,3-pentanediol monoisobutyrate | 27.0 |
|   | benzyl alcohol | 80.0 |
| E | deionized water | 121.79 |
|   | AEROSOL OT-75 | 0.50 |
|   | PERGOPAK M3[11] | 32.0 |
| F | RM 825[12] | 1.25 |
| G | deionized water | 23.0 |
| H | acrylic emulsion polymer of Example IX, above | 450.0 |

| Charge | Ingredients | Parts by Weight (grams) |
|--------|-------------|-------------------------|
|        | FOAMASTER R | 1.0 |

[8] This thickener is commercially available from Hercules Inc.
[9] This amine is commercially available from Angus Chemical Company.
[10] This defoamer is commercially available from Diamond Shamrock.
[11] This urea formaldehyde condensate is a flatting agent commercially available from Lonza, Inc.
[12] This thickener is commercially available from Rohm and Haas.

The clear coating composition was prepared as follows. First a paste was prepared by the following regimen: Charge A was mixed in a Cowles disperser for 10 minutes followed by the addition of B and a 20 minute Cowles mix. Then C was added and the mixture subjected to a 5 minute Cowles mix followed by D and a 10 minute Cowles mix, E and a 10 minute Cowles mix and then finally F and a 10 minute Cowles mix. The cowles dispersion was then washed out with G which was added to the paste. The aforesaid paste was then added to H which had been premixed for 5 minutes. The entire composition was then finally mixed for another 5 minutes.

The clear coating composition had a total solids content of 30 percent.

What is claimed is:

1. A method of forming a multilayered finish on a substrate, comprising:
   I. applying a decorative finish to a substrate;
   II. applying a clear, aqueous based coating composition over the decorative finish of step I, said clear coating composition comprising:
      (a) a waterborne polymer having a calculated glass transition temperature of at least about 40° C. and having a one component working parameter of solubility, δ wp, in the range of about 9.0 to about 9.6 (cal./cm$^3$)$^{\frac{1}{2}}$, with $$\delta wp = \frac{\Sigma Fi}{\Sigma Vi}$$

wherein
   Fi=the molar attraction constant of an individual functional group of the polymer expressed in cal.$^{\frac{1}{2}}$cm$^{3/2}$/mole, and
   Vi=the molar volume constant of an individual group of the polymer expressed in cubic centimeters per mole; and
      (b) an amount of coalescing component sufficient to form a coalesced film, said clearcoating composition being essentially free of external crosslinking agents; and III. allowing the coating composition to coalesce.

2. The method of claim 1 wherein the waterborne polymer is an acrylic emulsion polymer containing one or more functional groups.

3. The method of claim 2 wherein the acrylic emulsion polymer is prepared from a vinyl monomer component which comprises at least 5 percent by weight of a vinyl monomer selected from epoxy functional vinyl monomer, hydroxyl functional vinyl monomer and mixtures thereof; and up to 2.0 percent by weight of an acid functional vinyl monomer.

4. The method of claim 3 wherein the epoxy functional monomer is glycidyl methacrylate.

5. The method of claim 3 wherein the epoxy functional monomer is glycidyl acrylate.

6. The method of claim 3 wherein the acrylic emulsion polymer is derived from at least 10 percent by weight of a hydroxyl functional vinyl monomer.

7. The method of claim 6 wherein the hydroxyl functional vinyl monomer is selected from 2-hydroxyethyl acrylate, 2-hydroxyethyl methacrylate, 2-hydroxypropyl methacrylate and vinyl acetate polymers or copolymers which are subsequently hydrolyzed.

8. The method of claim 3 wherein the acrylic emulsion polymer is derived from up to 1.0 percent by weight of an acid functional vinyl monomer.

9. The method of claim 8 wherein the acid functional vinyl monomer is acrylic acid.

10. The method of claim 8 wherein the acid functional vinyl monomer is methacrylic acid.

11. The method of claim 1 wherein the calculated glass transition temperature is at least about 55° C.

12. The method of claim 1 wherein the working parameter of solubility ranges from about 9.25 to about 9.6.

13. The method of claim 1 wherein the coalescing component is a blend of solvents which comprises benzyl alcohol and 2,2,4-trimethyl-1,3-pentanediol monoisobutyrate.

14. The method of claim 13 wherein the coalescing component is present in the coating composition in an amount ranging from about 5 to about 25 percent by weight, the percentages based on the total weight of the composition.

15. The method of claim 1 wherein the decorative finish of step I is a pigmented basecoating composition.

16. The method of claim 1 wherein the decorative finish of step I is a wallpaper finish.

* * * * *